United States Patent
Bailey

(10) Patent No.: US 7,770,801 B1
(45) Date of Patent: Aug. 10, 2010

(54) ENVIRONMENTALLY FAVORABLE REWARD CARDS

(75) Inventor: Mark H. Bailey, Trophy Club, TX (US)

(73) Assignee: I3 Plastic Cards, LLC, Dallas, TX (US)

( * ) Notice: Subject to any disclaimer, the term of this patent is extended or adjusted under 35 U.S.C. 154(b) by 4 days.

(21) Appl. No.: 12/188,420

(22) Filed: Aug. 8, 2008

(51) Int. Cl.
*G06K 19/02* (2006.01)

(52) U.S. Cl. .................. 235/487; 235/488; 235/494; 428/32.1; 428/32.11; 428/32.14; 428/32.21; 428/32.22; 347/1

(58) Field of Classification Search .................. 235/488, 235/494; 428/32.1, 32.14, 32.21, 32.28, 428/32.36; 347/1
See application file for complete search history.

(56) References Cited

U.S. PATENT DOCUMENTS

| | | | |
|---|---|---|---|
| 2,556,078 A | 6/1951 | Francis, Jr. | |
| 4,223,128 A * | 9/1980 | Halek et al. | 528/481 |
| 4,542,288 A | 9/1985 | Drexler | |
| 5,393,590 A | 2/1995 | Caspari | |
| 5,486,397 A | 1/1996 | Gordon et al. | |
| 5,489,567 A * | 2/1996 | Koshizuka et al. | 503/227 |
| 5,731,064 A * | 3/1998 | Suss | 428/195.1 |
| 5,942,330 A | 8/1999 | Kelley | |
| 6,095,220 A | 8/2000 | Kobayashi et al. | |
| 6,264,296 B1 | 7/2001 | Klinefelter et al. | |
| 6,471,128 B1 | 10/2002 | Corcoran et al. | |
| 6,979,141 B2 | 12/2005 | Karst et al. | |
| 7,037,398 B2 | 5/2006 | Kwasny et al. | |
| 2004/0053017 A1 * | 3/2004 | Daems et al. | 428/195.1 |

FOREIGN PATENT DOCUMENTS

JP 11291680 10/1999

* cited by examiner

*Primary Examiner*—Steven S Paik
*Assistant Examiner*—Minghui Yang
(74) *Attorney, Agent, or Firm*—Luedeka, Neely & Graham, PC

(57) ABSTRACT

A reward or retailer's card and a method of making a card having an overall recycle code of no greater than about 5. The card includes a core card stock made of a material having a recycle code of less than about 5. Variable indicia is printed on the card stock. A hot stamped substantially transparent foil layer is applied to at least the variable printed indicia on the card stock to protect the printed indicia.

13 Claims, 3 Drawing Sheets ary FAVORABLE REWARD CARDS

TECHNICAL FIELD

The disclosure, relates to a reward card construction and in particular to a substantially permanent reward card that has a construction that enables the card to be recycled in a more environmentally friendly way.

BACKGROUND AND SUMMARY

Reward cards, frequency cards, loyalty cards, etc. are distributed by retailers in order to track consumer spending and preferences and to offer rewards to loyal customers. The cards come in a number of sizes and shapes and are typically credit card sized or key chain card sized. The ideal reward card has a variable account number assigned to each customer. Accordingly, the card is designed to last as long as possible in order to reduce the cost to the retailer of supplying replacement cards for cards that are damaged or otherwise unusable.

In order to reduce the cost of producing the cards, the card stock is typically printed with variable data associated with a customer using, for example, and ink jet printer. Variable data may be included in a bar code, an encoded magnetic strip, a series of machine readable numbers, or other identifying indicia. Currently, the printed indicia on the cards is protected by laminating the cards with an adhesive film. The card stock that is printed is a silica filled porous polyolefin available from PPG Industries of Pittsburgh, Pa. under the trade name TESLIN.

In terms of recyclability, the TESLIN card stock has a recycle code of 7. Recycle codes vary from 1 to about 7. The lower the number the higher the degree of recyclability. TESLIN card stock is typically used for reward card applications because may be printed with an ink jet printer wherein the printed image is more durable than with other card stocks. Adding a clear laminating film to the TESLIN card stock to improve the durability of the card may further reduce the recyclability of the cards.

Hot and cold laminates are the most common methods used to protect printed areas on such cards. However, laminates tend to be expensive, typically costing 6 to 80 cents per square foot for materials. The labor-intensive nature of producing durable laminated cars also increases the cost of such cards. Laminates may be applied on one or both surfaces of the card. One-sided lamination may lead to excessive curling of card, whereas two-sided laminations may be very expensive in terms of material and labor costs and may excessively increase the thickness of the card. Adhesives used for cold laminates may be tacky at room temperature, leaving a sticky residue at the edges of the cards. Additionally, binders used in creating cold laminates are typically water-based, which means the card may delaminate if exposed to excessive water or other liquid. Laminates are also susceptible to trapped air pockets, which are viewed as card defects and may reduce the readability of the variable indicia on the card. Most importantly, care must be taken to ensure that the laminates are accurately aligned to the printed cards, and such alignment is especially critical for a continuous web laminate. What is needed therefore is a durable card construction that provides the card with a relatively low recycle code and that does not have the disadvantages of laminated cards described above.

With regard to the foregoing, the disclosure provides a reward or retailer's card and a method of making a card having an overall recycle code of no greater than about 5. The card includes a core card stock made of a material having a recycle code of no greater than about 5. Variable indicia is printed on the card stock. A hot stamped substantially transparent foil layer is applied to at least the variable printed indicia on the card stock to protect the printed indicia.

In another embodiment, the disclosure provides a method of making a retailer's card having a recycle code of no greater than about 5. The method for making the card includes printing variable indicia on a card stock having a recycle code of less than about 5. The variable printed indicia on the card stock is cured using ultraviolet (UV) light. A substantially clear foil layer is hot stamp over at least the UV cured printed indicia to protect the printed indicia. The resulting card has an overall recycle code of no greater than about 5.

An advantage of the embodiments of the disclosure is that substantially permanent cards may be made that are highly recyclable and do not require the lamination of films that may peel from the surface of the cards thereby allowing the printed indicia to be scraped off, smeared, or otherwise damaged. Accordingly, the disclosed embodiments not only protect the environment, but the embodiments also reduce the production costs of the cards and reduce the need for the retailers to replace damaged cards.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
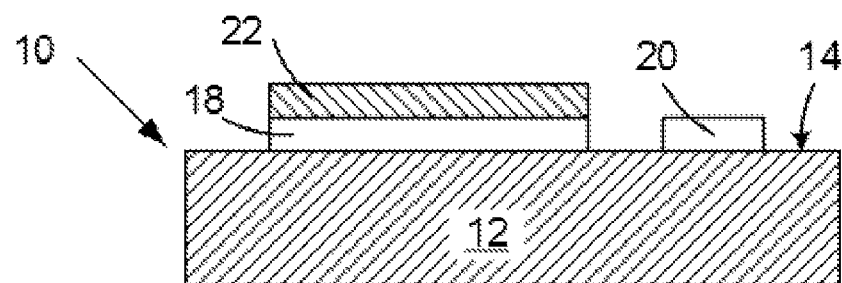
FIG. 1 is a cross-sectional side view, not to scale, of a card having a printed surface and a protective foil covering the printed surface according to an embodiment of the disclosure.

Embodiments of the disclosure provides a relatively inexpensive retailer or reward card having durable variable printed indicia thereon and that has increased recyclability properties and a method for making the card. As described in more detail below, the printed indicia is protected with a heat stamped substantially transparent foil layer that does not adversely affect the recycle code of the card. The heat stamped foil is applied from a carrier web as a colorless transparent film to the printed area on the card. Selective application of the heat stamped foil is possible so that a minimum amount of foil is required to protect the printed indicia on a card. In the alternative, the heat stamped foil may be applied to an entire surface of one or both sides of the card if desired.

The substantially transparent foil layer applied to the card is obtained by transferring the foil layer from a backing web. The backing web may be a thermoplastic material that includes a release layer between the backing web and the foil layer. The foil layer may be a single layer or may include multiple material layers. The foil layer may have a thickness ranging from about 1 mil to about 5 mils. As the donor web is heated and pressed into contact with the printable surface of a medium, the foil is transferred onto the printable surface of the medium.

The substantially transparent foil layer may be provided by coating a continuous web of the backing material with a material selected from cellulose acetate, cellulose butyrate, nitrocellulose, alkyl cellulose ethers, carboxy-alkyl cellulose ethers, hydroxy-alkyl cellulose ethers, mixed ether-esters of cellulose, polyvinyl acetate resins, polyvinyl chloride resins, copolymers of vinyl acetate and styrene, coumarone-indene resins, polyethylene resins, acrylic resins, polyamide resins, and the like.

The material providing the foil layer is suitably devoid of materials that are effective to increase the recycle code of the card to greater than about 5. Recycle codes are published by the American Plastics Council for plastic packaging resins and are exemplified in the following table:

| Material | Recycle Code Value |
|---|---|
| Polyethylene terephthalate (PET) | 1 |
| High density polyethylene (HDPE) | 2 |
| Polyvinyl chloride (PVC) | 3 |
| Low density polyethylene (LDPE) | 4 |
| Polypropylene (PP) | 5 |
| Polystyrene (PS) | 6 |
| Other | 7 |

The substantially transparent foil layer may improve print area quality and may increase durability of the printed areas. For example, the foil layer may provide good protection against various substances that might spill on the surface of a printed card. Non-limiting examples of substances that may affect the printed surfaces on an unprotected card include, water, alcohol, ink, coffee, soda, ammonia based or other cleaning liquids, food stains (e.g. mustard, chocolate, berry), and dirt.

The substantially transparent foil layer may be applied in a way that provides, for example, a gloss finish or a matte finish to the printed indicia area. The particular finish of the foil layer may be controlled by the application temperature, pressure, and stamping speed. In addition, the patterns may be created in the foil layer using a thermal bar as the heating element.

The composition of the foil layer may be formulated to target specific properties. For example the foil layer may be formulated to achieve a specific gloss or matte level, and to enhance the gloss uniformity or the matte uniformity of the layer. The foil layer may also be formulated with materials or additives which improve the printed indicia's indoor light fade resistance, UV light fade resistance, resistance to water and other liquids, vapor resistance, scratch resistance, and blocking resistance. Additionally, the foil layer may be formulated to have a colorless or color-tinted appearance, provide a flexible, conformable coating, optimize the release of the foil layer from the donor web, and maximize the adhesion of the foil layer to the card surface.

Non-limiting examples of light resisting additives that may be added to the foil layer for transfer to the surface of the card include, but are not limited to, the hindered amine series light stabilizers. The foil layer may also include UV absorbers, which can include, but are not limited to, the benzophenone series UV absorbers, benzotriazole series UV absorbers, acetanilide series UV absorbers, cyanoacrylate series UV absorbers, and triazine series UV absorbers.

Non-limiting examples of liquid resistance additives or vapor resistance additives that may be added to the foil layer are additives that decrease the wetability of the surface of the foil layer by decreasing the surface energy, thereby repelling liquids such as (but not limited to) water from the surface. Such additives may include the family of fluoro-surfactants, silanes, siloxanes, organosiloxanes, siliconizing agents, and waxes or combinations thereof.

The foil layer may be a single layer of material or may be multiple layers of material having different properties in each layer. For example, one of the layers of the foil layer may include a material having barrier properties (i.e., having very low permeability toward gases such as oxygen or water vapor. Examples of materials that may provide suitable barrier properties are co-polymers of acrylonitrile or co-polymers of vinylidene chloride or vinylidene fluoride. Use of materials with barrier properties in the foil layer makes it possible to dramatically increase protection of the printed indicia from humidity and fade that may be caused in part by oxidation of the colorants in the printed area.

An important characteristic of the substantially clear foil layer is that the foil layer should be flexible. Materials are typically selected so that the foil layer may readily conform to the surface of the card. During application, the material providing the foil layer should not crack or break, thereby leaving blemishes, area degradations, or exposed printed indicia. Further, the material of the foil layer should conform and adhere to the surface of the card during bending, flexing, or folding, as might be experienced during typical handling of the card. A particularly suitable substantially transparent foil layer may be provided by the clear foil material available from API Foils, Inc. of Rahway, N.J. under the trade name ZU26700 clear gloss foil.

The card stock to which the printed indicia and foil layer are applied may be selected from a variety of materials having a recycle code of less than about 5. Suitable materials for the card stock include, but are not limited to paperboard, polyethylene terephthalate, high density polyethylene, polyvinyl chloride, low density polyethylene, polypropylene, and the like.

The card stock may also include one or more coatings to improve the printability of the surface thereof. Such materials may include pigments, polyesters, polyolefins, poly(vinyl-ethylene-co-acetate), polyethylene-co-acrylics, amorphous polypropylene and copolymers and graft copolymers of polypropylene. Adhesive are typically avoided as the adhesives may increase the recycle code of the card to above 5.

The card stock typically includes a sheet of material having first and second surfaces in the shape of a square or rectangle, though the shape of the card stock is not limited in any way and the size and thickness of the card stock may vary over wide limits. For example, the card stock may have a thickness ranging from about 5 mils to about 40 mils.

One of ordinary skill in the art will understand that a printed area can be applied to a printable surface of the first or second surface of the card stock using commonly known and available means, such as inkjet printing, flexographic printing, screen printing, rotogravure printing, or electrostatic printing. Accordingly, the printing processes may include, but are not limited to inks conventionally used in inkjet, offset, and gravure. In addition, the printing process includes imaging means used in liquid electrophotography, electrophotography, and conventional photography. When inkjet printing is used, for example, both dye based and pigment based inkjets inks may be used. The inks, toners, or imaging materials may be formulated to optimize the adhesion of the foil layer to the printed surface of the card stock.

If inkjet printing is used, excess moisture from the inks may impede adhesion or uniform dispersion of the foil layer to the printed surface. Also, if excess moisture is trapped between the card stock and the foil layer, the printed area may bloom or blur at its edges. Accordingly, it is highly desirable that the printed area be essentially moisture free. Subsequent to the printing process, the printed area is cured to provide a substantially moisture free printed surface. Curing of the printed are may be achieved by ultraviolet (UV) radiation, infrared radiation, and/or heat curing of the printed surface.

In order to apply the foil layer to the printed surface of the card, the printed area may be preheated. Preheating of the printed area may occur during the ink curing step.

A suitable heating element used for applying the foil layer to the printed area of the card may be selected from a heated roller, a hot stamp die, a ceramic heat bar, or a thermal printhead. A ceramic heat bar, similar to what is used in many monochrome electrophographic fusers, provides a suitable means of providing uniform, continuous, transfer of the foil layer to the card. In addition, ceramic elements have a lower thermal mass than a typical heated roller, thus they quickly reach the desired temperature and quickly cool following application of the foil layer to the card, thereby enhancing energy efficiency and reducing start-up time. A thermal printhead, similar to what is used in thermal transfer or dye sublimation printers or faxes, provides another means of providing continuous or intermittent, discrete, application of the foil layer to the card. The heating element may be rigid, or it may be compressible, with the compression level influencing the nip area.

In one embodiment, the card is positioned over a base or platen, and the heating element and base are pressed towards each other to create a nip area. Like the heating element, the base may be rigid, or compressible, with the compression level influencing the nip area. The base may be coated with a non-stick (non-wetting), heat-resistant surface. A solid lubricant may be used to provide such a non-stick surface. The solid lubricant may be a fluororesin, fluorocarbon, or fluoropolymer coating such as (poly)-tetrafluoroethylene (PTFE), perfluoroalkoxy (PFA), fluorinated ethylene propylene (FEP), ethylene tetrafluoroethylene (ETFE), ethylene chlorotrifluoroethylene (ECTFE), polyvinylidene fluoride (PVDF). In addition a replenished liquid lubricant, such as silicone oil, may be used to provide a non-stick surface.

In another embodiment, the heating element, the base and the carrier web span beyond the width of the printed surface of the card to be coated. During application, the heating element and base maintain a constant nip force and area across the carrier web, which is in contact with the printed surface of the card. Since the carrier web and nip area extend beyond the printed area, full coating to all printed areas is insured. The non-stick base surface ensures that the foil layer is only transferred to the printed surface of the card and not to the surrounding non-stick surface of the base. Only that portion of the foil layer that touches the printed surface of the card separates from the carrier web and is applied to the card. The rest of the foil layer extending beyond the edges of the printed area remains connected to the carrier web.

In addition to limiting the area of application of the foil layer to the printed surface of the card by providing a non-stick surface on the base, the area of the printed surface of the card that actually receives a foil layer may be further limited to a specific portion of the printed surface by limiting the application of the foil layer to only an area of the card where heat and pressure are applied. Selective application of the foil layer to the card may be achieved with the use of a thermal printhead, as used in thermal transfer printers. For example, selected printed areas, such areas containing identification codes for customers on the printed surface may have the foil layer applied thereto while other printed areas of the card that do not contain personalized information or indicia may remain uncoated. Selective application of a protective film layer on discrete areas of the card is not feasible with conventional laminates and conventional laminating processes.

The speed of the carrier web containing through the heating element is maintained at the same speed as the cards thus ensuring a uniform coverage of the foil layer to the card. A source roll of carrier web is located upstream of the heating element and a take-up roll is located downstream of the heating element. The source roll is torque limited with a slip clutch or similar device to tension and present the foil layer material on the carrier web, and to allow the unrolling of the carrier web concurrent with the cards during application of the foil layer while ensuring that uncontrolled unrolling of the carrier web does not occur. The take-up roll provides enough torque to peel the carrier web from the foil layer on the cards, but not enough to pull the carrier web/card combination through the applicator or to distort the foil layer in the applicator. The take-up mechanism thus peels the carrier web from the coated cards, collects the carrier web, and helps maintain the uniform tension on the carrier web during application of the foil layer to the cards.

The heat stamped foil layer is an improvement over film lamination to cards as previously described. As described herein the foil layer is transferred onto the cards only at the locations that are subjected to the contact pressure and heat. The foil layer disengages from the carrier web as it is heated and only the foil layer and not the carrier web is attached to the cards. There is clean separation of between the foil layer and the carrier web at all edges of the printed area on the cards. In contrast, in conventional lamination processes, the transferred laminate is still attached to the supply source until separated by a manual or automated trimming step.

In addition, because the foil layer material separates from the carrier web at the edges of the printed area, alignment of foil layer to cards is not as critical as alignment of laminate film to cards. For example, if a laminate film is misaligned, excess material extends beyond the edge of the print area, requiring additional post lamination trimming. If a carrier web is misaligned with respect to the cards, the foil layer still separates from the carrier web at the edges of the printed area and no additional trimming is required.

Another advantage of the foil layer is that the foil layer is substantially thinner than most laminate films. Covering the printed area with the foil layer offers the advantage of providing an intimate, gap-free, bubble free bond with the card. The differences in the coefficient of thermal expansion between the foil layer and the card may result in less severe curling of the cards to which the foil layer is applied as compared to laminated cards.

Figure 2:
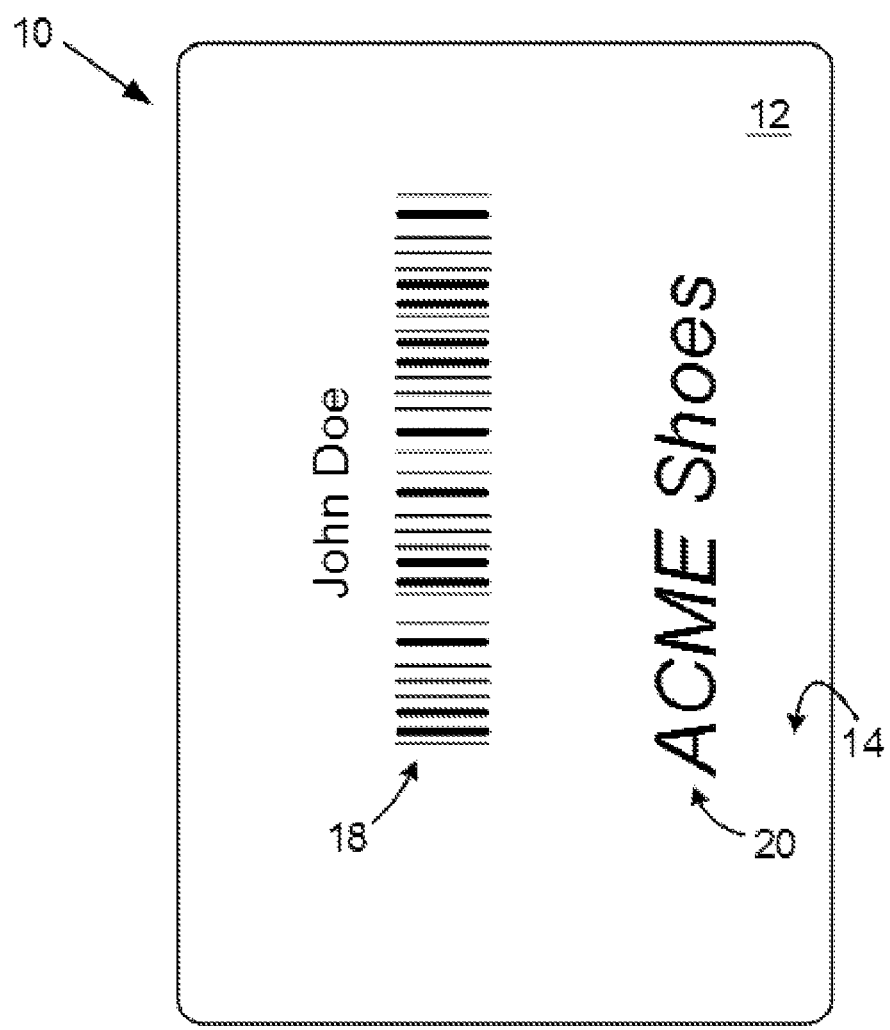
FIG. 2 is a plan view, not to scale, of a printed card without the protective substantially transparent foil layer protecting the printed area.
Figure 3:
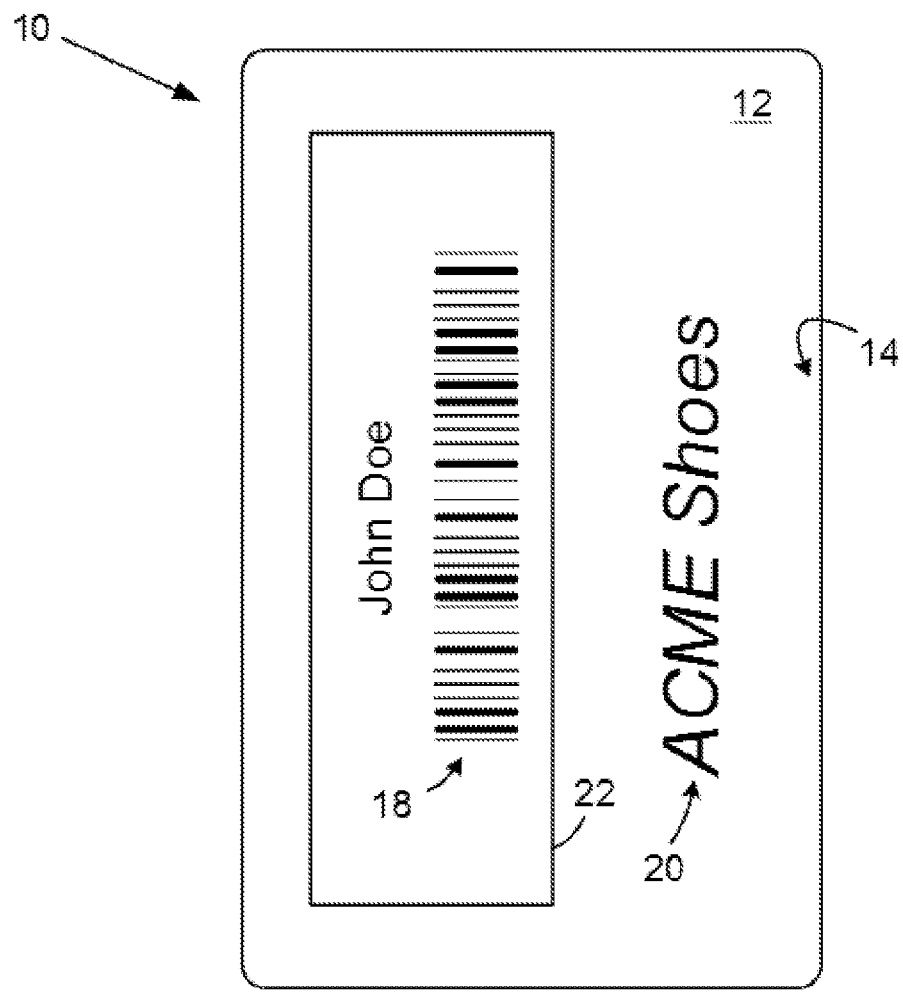
FIG. 3 is a plan view, not to scale, of a printed card having a substantially transparent foil layer protecting the printed area of the card.

A card 10 made according to the above disclosure is illustrated in a cross-sectional view in FIG. 1 and in plan view in FIGS. 2 and 3. The card 10 includes a card stock 12 having a first surface 14 and a second surface 16. In FIG. 1, the second surface 16 is an unprinted surface of the card which may or may not have a printable surface thereon, while the first surface 14—to which a printed areas 18 and 20 are applied—is the printed surface 14 of the card 10. The printed areas 18 and 20 are applied to the first surface 14 of the card 12 by one or more of the printing techniques described above. A foil layer 22, as disclosed herein, is applied to at least the printed area 18 on the first surface 14 of the card 10 in order to protect the printed area 18. The printed area may be viewed through the substantially transparent foil layer 22 as shown in FIG. 3.

As shown, the foil layer 22 covers and protects the printed area 18. In the alternative, the printed area 20 may also be protected by application of the foil layer 22 to the printed area 20. Likewise, if the second surface 16 of the card 10 includes printed areas, one or more of the printed areas on the second surface of the card may be covered and protected by a foil layer as described herein.

Figure 4:
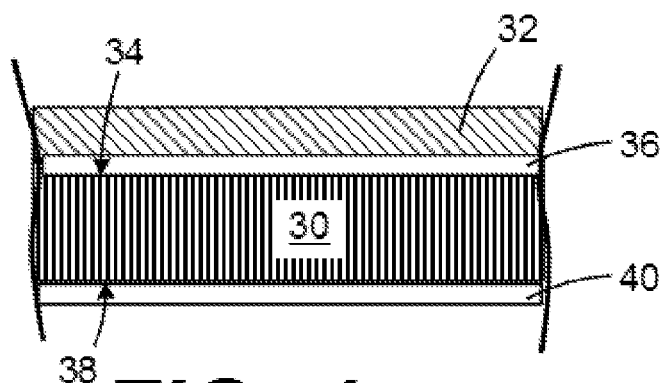
FIG. 4 is a cross-sectional view, not to scale, of a clear foil web for applying a substantially transparent foil layer to a card according to the disclosure.

A cross sectional view of a carrier web 30 having a foil layer material 32 thereon for applying the foil layer 22 to the card 10 is illustrated in FIG. 4. The carrier web 30 has a carrier side 34 that may include a release layer 36 thereon. The release layer 26 is sandwiched between the foil layer material 32 and the carrier web 30. An opposite side of the carrier web 30 may include a lubricant layer 40. The lubricant layer 40 is on an exterior surface 38 of the web 30. The lubricant layer 40 may reduce friction between the carrier web 30 and the heating element during application of the foil layer 22 to the card 10. The release layer 36 promotes the release of the foil layer material 32 from the web 30 so that the foil layer 22 may be applied to the printed area 28 of the card. A suitable release layer 36 may be a wax.

Figure 5:
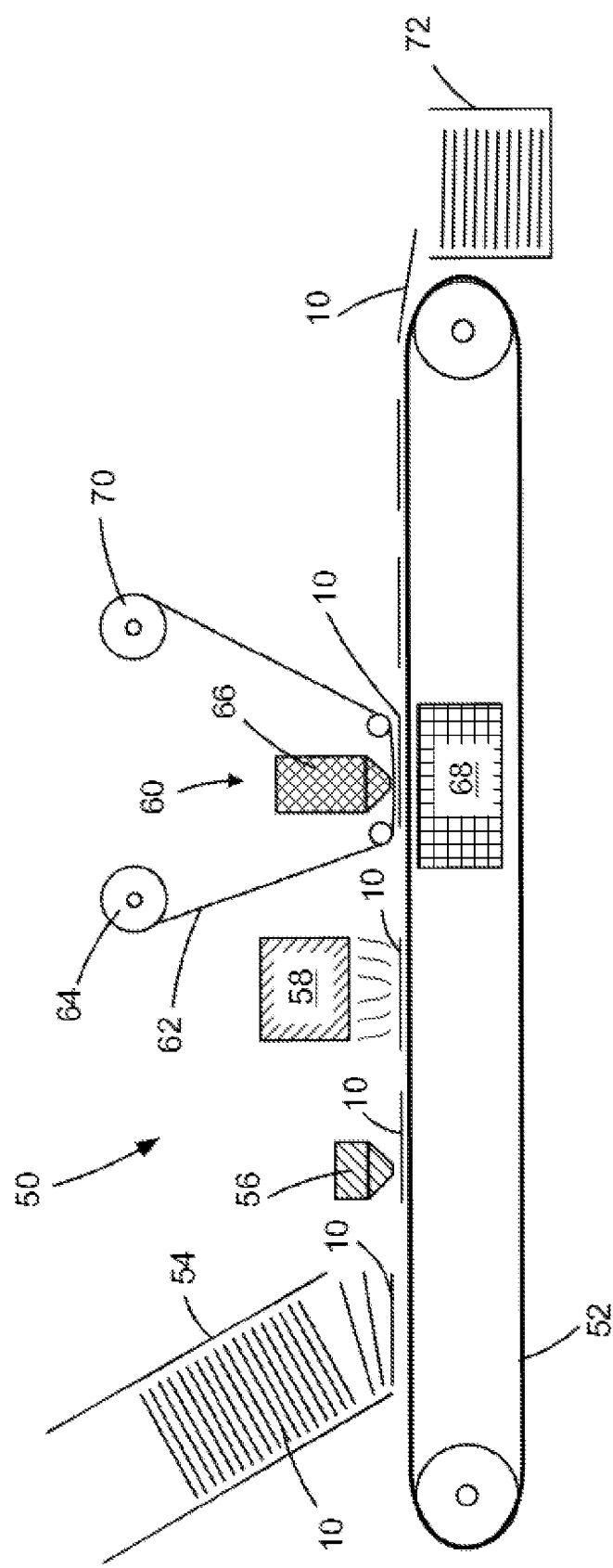
FIG. 5 is a schematic view of a process for making a card according to an embodiment of the disclosure.

FIG. 5 is a schematic illustration of a process 50 for making retailer and/or reward cards according to embodiments of the disclosure. The cards 10 may be prepared from card stock as described above and fed to a conveyer system 52 from a feed cassette 54 or any other suitable means. The cards 10 may also be provided as multiple cards on a sheet that are printed and coated and then separated from the sheet. The sheet may be cut sheets or may be provided as a web of sheet material on a roll. Regardless of whether individual cards or a sheet containing multiple cards is used, the cards 10 are printed using a printing device 56 such as an ink jet printer to provide variable indicia on the cards 10. Prior or subsequent to printing the variable indicia on the cards, the cards may be printed with non-variable indicia and/or graphics. The printed surfaces of the card are then cured in, for example, a UV curing oven 58 to remove any remaining moisture from the printed areas of the card 10. Next, the card 10 is conveyed to a hot stamping area 60 for selective application of the foil 22 to the printed area 18 of the card 10.

In the hot stamping area 60 a web 62 containing the carrier web 30 and foil layer material 32 is provided by a supply roll 64 to a hot stamping device 66 that applies selective heat and pressure to the web 62 to cause transfer of the foil layer 22 to the card 10. A platen or backing surface 68 may be used to apply pressure to the card as the web 62 is selectively heated by the hot stamping device 66. The foil layer material 32 may be heated to a temperature ranging from about 200° to about 400° C. in order to transfer the foil layer 22 to the card. Pressure in the range of from about 150 to about 250 psig may also be used to assure that the foil layer 22 is smoothly applied to the card in the selected printed area 18.

During the application of the foil layer 22 to the card 10, the hot stamping device 66 is raised and lowered to press the web 62 in contact with the card 10. A take up reel 70 provides tension on the web 62 and also collects the web 62 after the foil layer material 32 is removed therefrom by the hot stamping device 66. The coated cards 10 are then conveyed to a collection bin 72 for distribution to consumers.

While the disclosure has provided certain exemplary embodiments, it is to be understood by those skilled in the art that the exemplary embodiments are not limited to what is disclosed herein, but, on the contrary, is intended to cover various modifications included within the spirit and scope of the appended claims and equivalents thereof.

What is claimed is:

1. A reward card comprising:
    a core card stock comprising a material having a recycle code of 1, 2, 3, 4, or 5;
    variable ink-jet printed indicia on the card stock; and
    a hot stamped substantially transparent foil layer consisting essentially of a material selected from the group consisting of cellulose acetate, cellulose butyrate, nitrocellulose, alkyl cellulose ethers, carboxy-alkyl cellulose ethers, hydroxy-alkyl cellulose ethers, mixed ether-esters of cellulose, polyvinyl acetate resins, polyvinyl chloride resins, copolymers of vinyl acetate and styrene, coumarone-indene resins, polyethylene resins, acrylic resins, polyamide resins, applied to at least the variable printed indicia on the card stock to protect the printed indicia,
    wherein the card is devoid of an amount of adhesive layer between the card stock and the foil layer sufficient to adhere the card stock and the foil layer to one another and wherein an overall recycle code for the reward card is 1, 2, 3, 4, or 5.

2. The reward card of claim 1, wherein the card stock is selected from the group consisting of paperboard, polyvinyl chloride, and combinations of two or more of the foregoing.

3. The reward card of claim 1, wherein the card stock has a thickness ranging from about 5 mils to about 40 mils.

4. The reward card of claim 1, wherein the foil layer has a thickness ranging from about 1 rail to about 5 mils.

5. The reward card of claim 1, wherein the variable printed indicia comprises ultraviolet (UV) curable ink jet printed indicia.

6. The reward card of claim 1, wherein the foil layer comprises a material that is substantially moisture impermeable.

7. A method of making a retailer's card having a recycle code of 1, 2, 3, 4, or 5, comprising:
    printing variable indicia using an ink-jet ink on a card stock having a recycle code of 1, 2, 3, 4, or 5;
    ultraviolet (UV) light curing the variable indicia printed on the card stock; and
    hot stamping at least the UV cured printed indicia with a substantially clear foil layer consisting essentially of a material selected from the group consisting of cellulose acetate, cellulose butyrate, nitrocellulose, alkyl cellulose ethers, carboxy-alkyl cellulose ethers, hydroxy-alkyl cellulose ethers, mixed ether-esters of cellulose, polyvinyl chloride resins, polyvinyl acetate resins, copolymers of vinyl acetate and styrene, coumarone-indene resins, polyethylene resins, acrylic resins, polyamide resins, to protect the printed indicia,
    wherein the card is devoid of an amount of adhesive layer between the card stock and the foil layer sufficient to adhere the card stock and the foil layer to one another and wherein the retailer's card has an overall recycle code of 1, 2, 3, 4, or 5.

8. The method of claim 7, wherein the card stock is selected from the group consisting of paperboard, polyvinyl chloride, and combinations of two or more of the foregoing.

9. The method of claim 7, wherein the card stock has a thickness ranging from about 5 mils to about 40 mils.

10. The method of claim 7, wherein the foil layer has a thickness ranging from about 1 mil to about 5 mils.

11. The method of claim 7, wherein the printing step comprises ink jet printing the card stock with an ultraviolet (UV) curable ink to provide the variable printed indicia.

12. The method of claim 7, wherein the foil layer comprises a material that is substantially moisture impermeable.

13. A substantially durable retailer's card made by the method of claim 7.

* * * * *